US012675371B2

(12) United States Patent
Murti et al.

(10) Patent No.: US 12,675,371 B2
(45) Date of Patent: Jul. 7, 2026

(54) DISTRIBUTED DATA PROTECTION FOR PHYSICAL SECURITY

(71) Applicant: Dell Products L.P., Round Rock, TX (US)

(72) Inventors: Arun Murti, Mission Viejo, CA (US); Adam Brenner, Mission Viejo, CA (US); Mark Malamut, Aliso Viejo, CA (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/740,391

(22) Filed: Jun. 11, 2024

(65) Prior Publication Data

US 2025/0377985 A1 Dec. 11, 2025

(51) Int. Cl.
| | |
|---|---|
| *G06F 16/30* | (2019.01) |
| *G06F 11/1446* | (2026.01) |
| *G06F 21/56* | (2013.01) |

(52) U.S. Cl.
CPC .......... *G06F 11/1469* (2013.01); *G06F 21/56* (2013.01)

(58) Field of Classification Search
CPC ............................. G06F 16/27; G06F 11/1469
See application file for complete search history.

(56) References Cited

U.S. PATENT DOCUMENTS

| | | | |
|---|---|---|---|
| 2012/0290537 A1* | 11/2012 | Smith ................. | G06F 16/1752 |
| | | | 707/700 |
| 2020/0401489 A1* | 12/2020 | Mitkar ............... | G06F 11/1435 |
| 2021/0019231 A1* | 1/2021 | Zhao ..................... | G06F 16/137 |
| 2024/0250969 A1* | 7/2024 | Brown ............... | H04L 63/1425 |
| 2024/0256394 A1* | 8/2024 | Jain ........................ | G06F 16/125 |
| 2024/0256670 A1* | 8/2024 | Jindal .................. | G06F 21/566 |
| 2025/0068749 A1* | 2/2025 | Deguchi ............... | G06F 21/62 |

\* cited by examiner

*Primary Examiner* — Khanh B Pham
(74) *Attorney, Agent, or Firm* — Staniford Tomita LLP

(57) ABSTRACT

Providing data protection by distributing backup data among a large plurality of distributed devices. A number of networked devices are deployed to protect data of a target device in the network. Each device of contains memory sufficient to store at least a portion of backed up data from the target device. Index information for backup data of the target device stored in each device. A cyber-attack condition is detected by a heartbeat or canary signal. Upon detection of an attack the devices enter a lockdown mode. The index information is used to reconstruct the backed up data from the portion of backed up data stored on each respective device.

20 Claims, 5 Drawing Sheets

100

300

Register deployed devices to use free space to store data
302

Store portion of index in each registered device for restoration
304

Send and forward heartbeat signal to registered devices
306

Attack Detected?
308

N

Y

Send Canary signal to the registered devices
310

Lockdown devices to prevent exposure of stored data
312

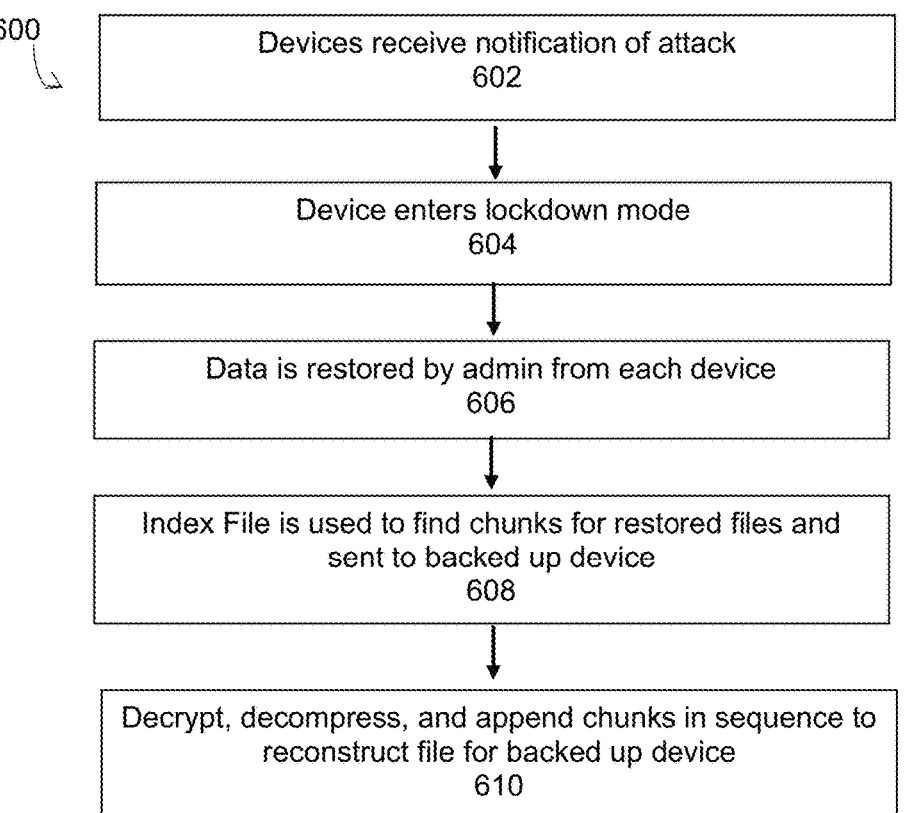

600

Devices receive notification of attack
602

Device enters lockdown mode
604

Data is restored by admin from each device
606

Index File is used to find chunks for restored files and
sent to backed up device
608

Decrypt, decompress, and append chunks in sequence to
reconstruct file for backed up device
610

FIG. 6

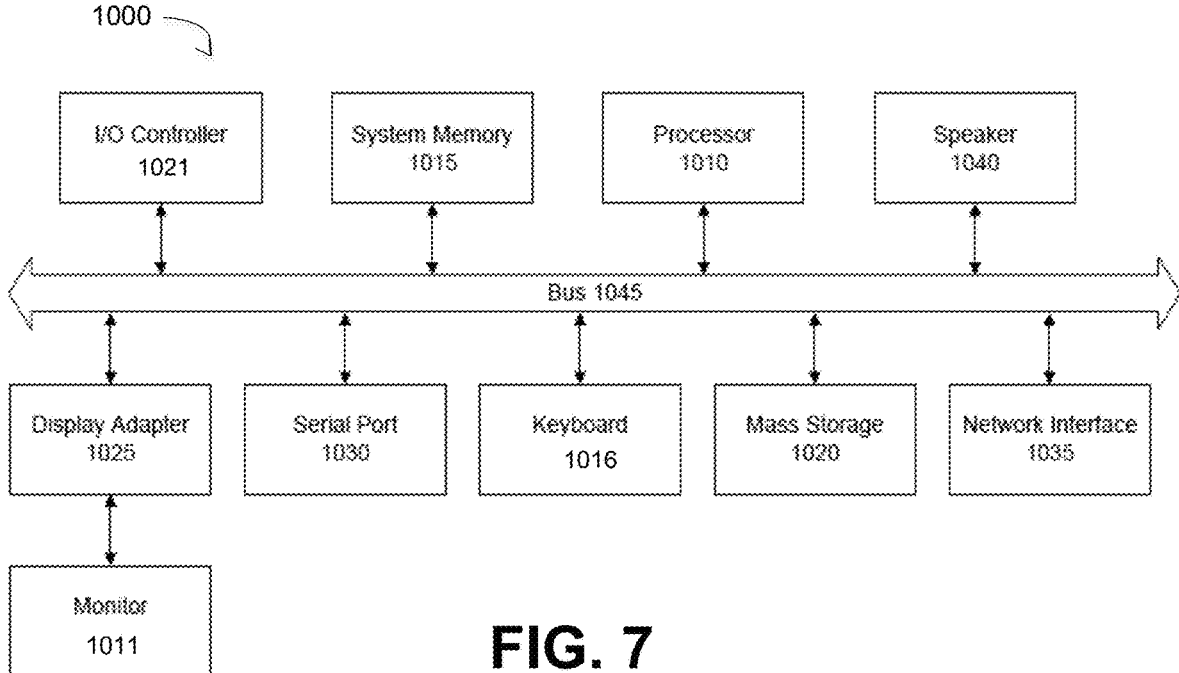

1000

| I/O Controller 1021 | System Memory 1015 | Processor 1010 | Speaker 1040 |

Bus 1045

| Display Adapter 1025 | Serial Port 1030 | Keyboard 1016 | Mass Storage 1020 | Network Interface 1035 |

Monitor
1011

FIG. 7

DISTRIBUTED DATA PROTECTION FOR PHYSICAL SECURITY

TECHNICAL FIELD

Embodiments are generally directed to distributed networks and more specifically to implementing distributed data protection for physical security.

BACKGROUND

Data protection for large-scale computer networks utilizes backup software that allows organizations to store their data for recovery after system failures, routine maintenance, archiving, and so on. Backup sets are typically taken on a regular basis, such as hourly, daily, weekly, and so on, and can comprise vast amounts of information. Data protection is also critically employed to protect users against deliberate cyber-attacks and data theft, such as by bad actors using malware, ransomware, supply chain attacks, and other methods to destroy or render critical business data unavailable to a user. This not only costs companies money, but can also pose a physical threat in critical applications or facilities, such as by putting lives at risk in places like hospitals or public utilities.

A common present approach to counter such attacks is to keep tertiary copies of mission-critical data in an isolated set of infrastructure, such as "vault" storage, where network access is allowed only to replicate data in, and user access is strictly restricted compared to production or backup network. Risk is not fully mitigated, however, since the mission-critical data is typically consolidated in one place, such as through the use of common storage and software that can be compromised in the production/backup network by exposing the data to the same potential security flaws introduced by those systems.

What is needed, therefore, is a data protection system that protects data from a threat of physical threat by minimizing the effect of central storage and protection.

The subject matter discussed in the background section should not be assumed to be prior art merely as a result of its mention in the background section. Similarly, a problem mentioned in the background section or associated with the subject matter of the background section should not be assumed to have been previously recognized in the prior art. The subject matter in the background section merely represents different approaches, which in and of themselves may also be inventions. EMC, Networker, Data Domain, RecoverPoint, and Data Domain Restorer are trademarks of DellEMC Corporation.

BRIEF DESCRIPTION OF THE DRAWINGS

In the following drawings like reference numerals designate like structural elements. Although the figures depict various examples, the one or more embodiments and implementations described herein are not limited to the examples depicted in the figures.

FIG. 6 is a flowchart that illustrates a process of restoring data backed up among devices in a distributed data protection system, under some embodiments.

FIG. 7 is a block diagram of a computer system used to execute one or more software components of a system for a distributed data protection system, under some embodiments.

DETAILED DESCRIPTION

Figure 1:
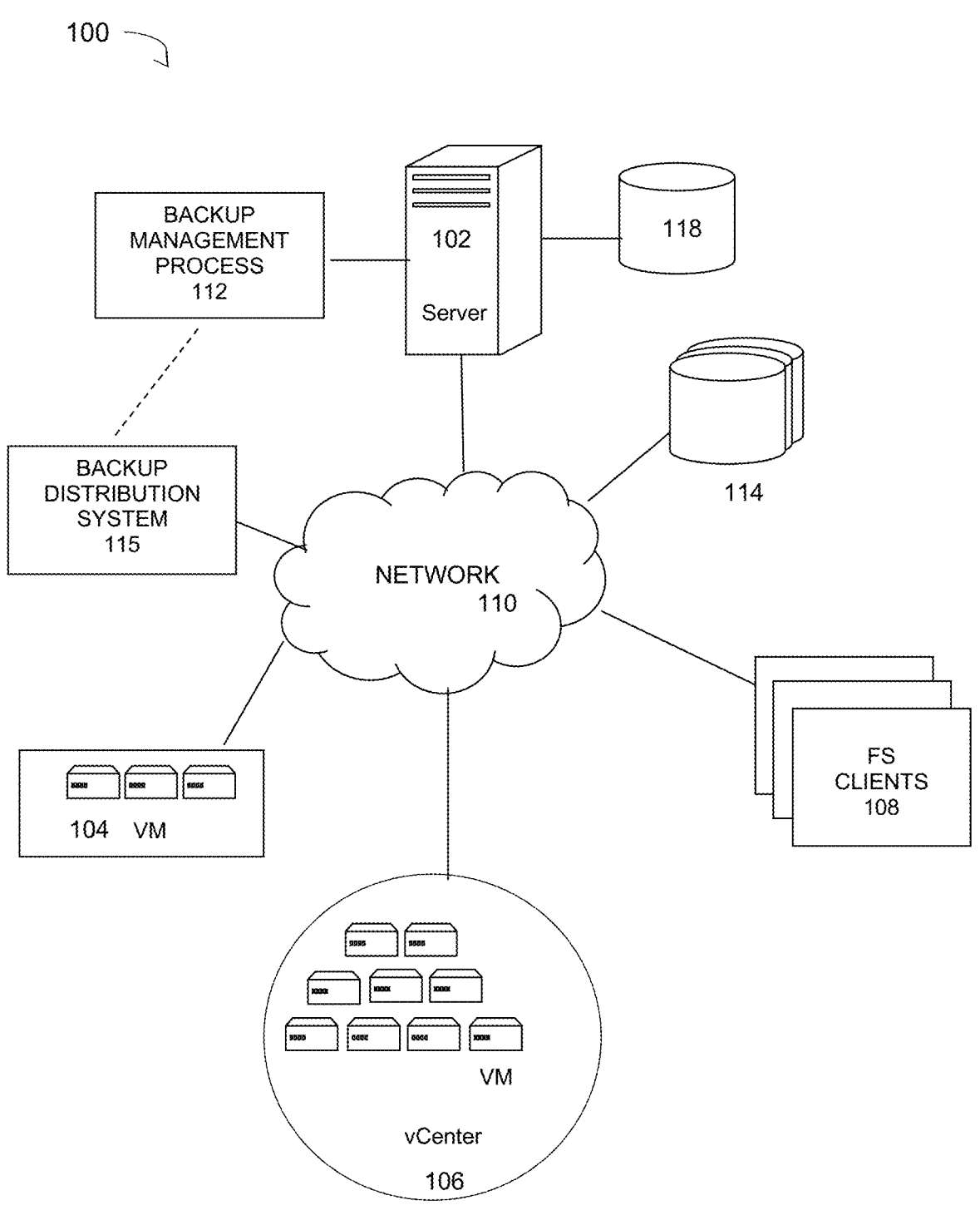
FIG. 1 is a diagram of a deduplication backup system implementing a distributed data protection process, under some embodiments.

A detailed description of one or more embodiments is provided below along with accompanying figures that illustrate the principles of the described embodiments. While aspects of the invention are described in conjunction with such embodiment(s), it should be understood that it is not limited to any one embodiment. On the contrary, the scope is limited only by the claims and the invention encompasses numerous alternatives, modifications, and equivalents. For the purpose of example, numerous specific details are set forth in the following description in order to provide a thorough understanding of the described embodiments, which may be practiced according to the claims without some or all of these specific details. For the purpose of clarity, technical material that is known in the technical fields related to the embodiments has not been described in detail so that the described embodiments are not unnecessarily obscured.

It should be appreciated that the described embodiments can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any physical medium that can contain or store the program for use by or in connection with the instruction execution system, apparatus or device. For example, the computer-readable storage medium or computer-usable medium may be, but is not limited to, a random-access memory (RAM), read-only memory (ROM), or a persistent store, such as a mass storage device, hard drives, CDROM, DVDROM, tape, erasable programmable read-only memory (EPROM or flash memory), or any magnetic, electromagnetic, optical, or electrical means or system, apparatus or device for storing information. Alternatively, or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory.

Applications, software programs or computer-readable instructions may be referred to as components or modules. Applications may be hardwired or hard coded in hardware or take the form of software executing on a general-purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the described embodiments. In this specification, these implementations, or any other form that the invention may take, may be referred to as techniques. In general, the order of the steps of disclosed processes may be altered within the scope of the invention.

Some embodiments of the invention involve automated data storage techniques in a distributed system, such as a very large-scale wide area network (WAN), metropolitan area network (MAN), or cloud based network system, however, those skilled in the art will appreciate that embodiments are not limited thereto, and may include smaller-scale networks, such as LANs (local area networks). Thus, aspects of the one or more embodiments described herein may be implemented on one or more computers executing software instructions, and the computers may be networked in a client-server arrangement or similar distributed computer network.

Embodiments include backup systems that store deduplicated data (deduplication backup systems) to reduce storage requirements in large-scale data systems. FIG. 1 is a diagram of a deduplication backup system implementing a distributed data protection process, under some embodiments. As shown in FIG. 1, system 100 includes a network server computer 102 coupled directly or indirectly to the target VMs 106, and to data sources 108 through network 110, which may be a cloud network, LAN, WAN or other appropriate network. Network 110 provides connectivity to the various systems, components, and resources of system 100, and may be implemented using protocols such as Transmission Control Protocol (TCP) and/or Internet Protocol (IP), well known in the relevant arts. In a distributed network environment, network 110 may represent a cloud-based network environment in which applications, servers and data are maintained and provided through a centralized cloud-computing platform.

The data sourced by system 100 may be stored in any number of other storage locations and devices, such as local client storage, server storage (e.g., 118), or network storage (e.g., 114), which may at least be partially implemented through storage device arrays, such as RAID components. The storage 114 may represent Network Attached Storage (NAS), which is generally dedicated file storage that enables multiple users and heterogeneous client devices to retrieve data from a centralized disk. Users on a local area network (LAN) can access the shared storage via a standard Ethernet connection. Other similar systems may also be used to implement an NAS resource.

Embodiments can be used in a physical storage environment, a virtual storage environment, or a mix of both, running a deduplicated backup program. In an embodiment, system 100 includes a number of virtual machines (VMs) or groups of VMs that are provided to serve as backup targets. Such target VMs may be organized into one or more vCenters (virtual centers) 106 representing a physical or virtual network of many virtual machines (VMs), such as on the order of thousands of VMs each. The VMs serve as target storage devices for data backed up from one or more data sources, such as file system (FS) clients 108, or other backup clients. Other data sources having data to be protected and backed up may include other VMs 104. The data sourced by the data source may be any appropriate type of data, such as database data that is part of a database management system.

In this case, the data may reside on one or more storage devices of the system, and may be stored in the database in a variety of formats.

In system 100, server 102 executes a data storage or backup management process 112 that coordinates or manages the backup of data from one or more data sources 120 to storage devices, such as network storage 114, client storage, and/or virtual storage devices 104. The data sourced by the data source may be any appropriate data, such as database data that is part of a database management system, and the data may reside on one or more hard drives for the database(s) in a variety of formats. In an embodiment, the backup process 112 uses certain known full and incremental (or differencing) backup techniques along with a snapshot backup process that is used to store an image or images of the system(s) to be backed up prior to the full or incremental backup operations.

In an embodiment, the network system 100 may be implemented as a DellEMC PowerProtect Data Manager (or similar) data protection system. This is an enterprise-level data protection software platform that automates data backups to tape, disk, and flash-based storage media across physical and virtual environments. A number of different operating systems (e.g., Windows, MacOS, Linux, etc.) are supported through cross-platform supports. Deduplication of backup data is provided by integration with systems such as DellEMC Data Domain and other similar storage solutions. Thus, the server 102 may be implemented as a DDR Deduplication Storage server provided by DellEMC Corporation. However, other similar backup and storage systems are also possible. In a general implementation, a number of different users (or subscribers) may use backup management process to back up their data on a regular basis to virtual or physical storage media for purposes of data protection. The saved datasets can then be used in data restore operations to restore any data that may be lost or compromised due to system failure or attack.

In an embodiment, system 100 may represent part of a Data Domain Restorer (DDR)-based deduplication storage system, and server 102 may be implemented as a DDR Deduplication Storage server provided by DellEMC Corporation. However, other similar data storage systems are also possible. A deduplication storage system generally represents a single-instance storage system in which redundant copies of data are eliminated to reduce storage overhead. Redundant data blocks are replaced with a pointer to the unique data copy so that only one unique instance of data is stored on the storage media (e.g., flash memory, disk, tape, etc.).

The data protection server 102 executes backup and recovery software that are crucial for enterprise-level network clients. Users rely on backup systems to efficiently back up and recover data in the event of user error, data loss, system outages, hardware failure, or other catastrophic events to allow business applications to remain in service or quickly come back up to service after a failure condition or an outage. Such systems are also critical in protecting users from cyber-attacks in which data is stolen, corrupted, or otherwise compromised.

Data protection systems (e.g., Avamar, Networker and PowerProtect Data Manager from DellEMC) require a user to create a protection policy that protects all or part of one or more data assets. By protecting assets, this allows data protection products to backup and restore the assets, which in turn offer protection and recovery of data on the assets. Policies allow a user or system administrator to specify several parameters of the backup process, such as the datasets to be backed up, storage targets, backup types (full, incremental, differential, etc.), and so on.

As mentioned above, one vulnerability with present data protection systems is the consolidation of data in one site, such as through the use of common storage or software, such that a single attack can expose all or nearly all of the mission critical data of an organization. To overcome this disadvantage, system 100 includes a backup distribution system that distributes this data across hundreds or thousands of devices, all of which cannot be feasibly compromised before the attack is identified and neutralized. This process leverages individual devices of the system and/or the users, such as desktop computers, laptop computers, tablets, smartphones, near/far edge infrastructure devices, and so on. The full set of devices represents a diverse set of technologies, such as hardware, firmware, applications, operating systems (OS), and so on, so that they are unlikely to all share the same set of common vulnerabilities. Such devices are usually already connected to the backup system through dedicated or other data protection schemes. The free space of such devices is identified and then used by process 115 to store certain data under certain policies. The free space is used up to a configurable limit and any data written by process 1155 is excluded from the device's own backup datasets. Process 115 is complementary to other layered security measures. For example, existing backup systems and vaults are maintained, and existing cybersecurity monitoring and logging systems can be continued to be used for attack detection and notification.

Figure 2:
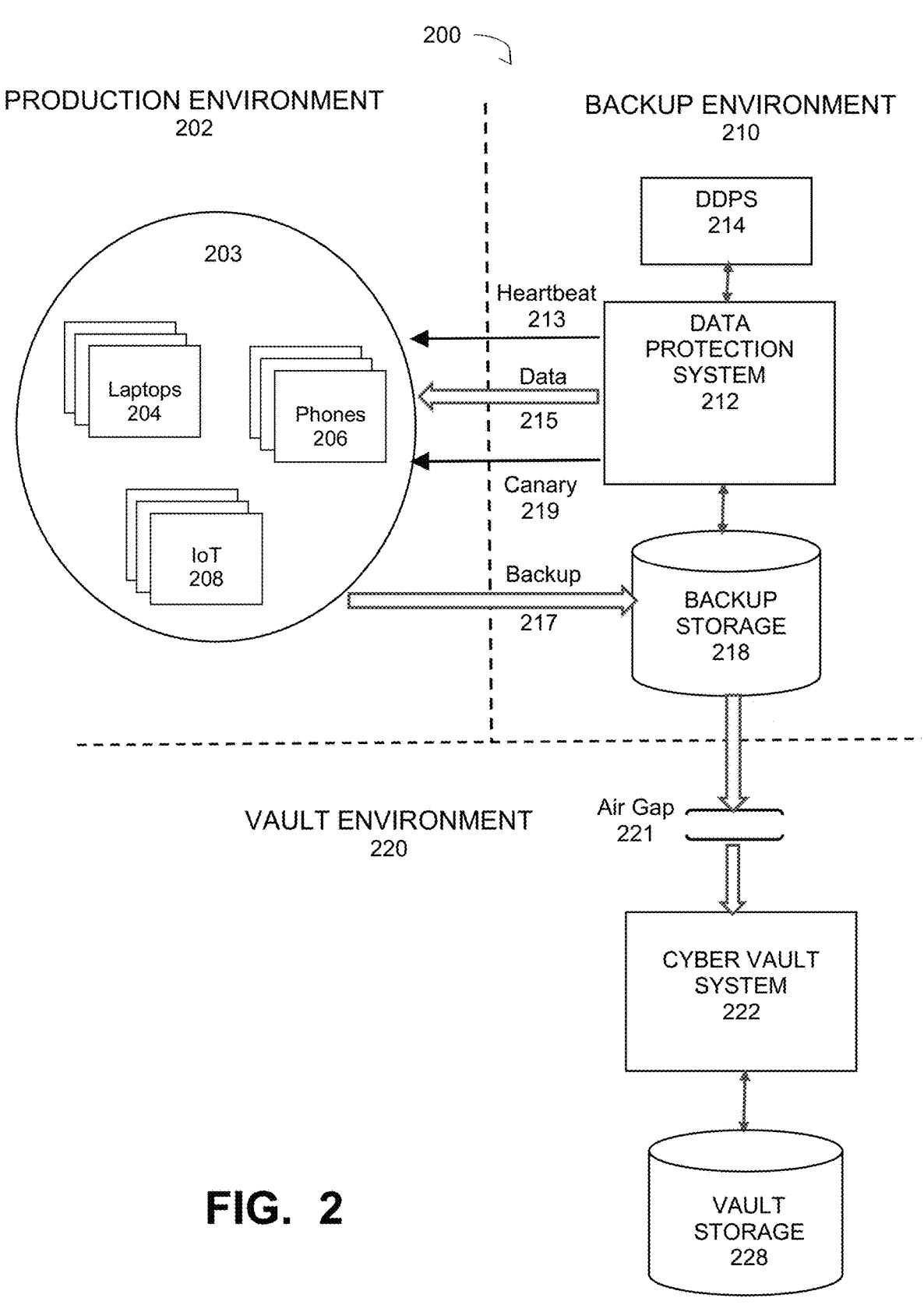
FIG. 2 is a diagram of a large-scale network including a distributed data protection system and method, under some embodiments.

FIG. 2 is a diagram of a large-scale network including a distributed data protection system and method, under some embodiments. As shown in FIG. 2, system 200 comprises a production environment 202 that includes a large number of users and devices. The devices may range from any appropriate networked device such as computers 204 (desktops, laptops, etc.), communication devices 206 (smartphones, etc.), Internet-of-Things (IoT) devices 208, and other similar devices that have some amount of resident storage and processing resources, along with adequate network connectivity. The production environment may be a network of any number of users of deployed devices that access and utilize applications and infrastructure to backup and protect their data in backup environment.

In an embodiment, the backup environment 210 includes a data protection system 212 that backs up data to backup storage 218. The backup environment 210 may be at least partially implemented through a server or cloud-based deduplication system, such as the backup system 100 of FIG. 1. Long-term or archive secure storage for cyber recovery may be provided by a vault environment 220 that includes a cyber vault server or system 222 and vault storage 228.

The cyber vault 220 is a highly secure repository for safeguarding production data and applications against cyber threats. It may utilize a multi-layered defense strategy using secure storage, advanced encryption, access control, and monitoring mechanisms to protect sensitive data from unauthorized access, malware, and data loss. The cyber vault system 222 centralizes backup data from backup system 210 in an immutable backup to ensure that critical information remains intact in the event of any cyber-attack.

The cyber vault environment 220 is designed to move critical data away from the attack surface, physically isolating it within a protected part of a data center and requires separate security and access credentials for access. Additional safeguards include an automated operational air gap 221 to provide network isolation and eliminate management interfaces which could be compromised. The cyber vault system 222 automates the synchronization of data between production systems including open systems and mainframes, and vault storage 228 creating immutable copies with locked retention policies. In the event of a cyberattack, users can quickly identify a clean copy of data and recover critical systems so that operations can be resumed.

In an embodiment, system 200 utilizes the many devices 203 (e.g., on the order of hundreds to thousands) in the production environment 202 for distribution of the critical production data among as large a number of devices to foil any cyber-attacks. The strategy relies on the fact that this large number of devices cannot feasibly all be compromised before the attack is detected, identified, and at least to some extent, mitigated or prevented.

System 200 includes a DDPS (Distributed Data Protection System) component 214 within the backup environment 210. This can be embodied as a processing component or software program integrated with the data protection (DP) software in DP system 212. The DDPS component 214 sends a heartbeat signal to the appropriate devices 203 unless an attack has already been detected via standard mechanisms. The heartbeat signal is a short message, sent at a fixed frequency, such as once per minute, to indicate that the DDPS component is running in a healthy state, and that no attack has been detected.

Each appropriate device 203, or any type, is registered with the DDPS 214 as a device configured to store at least some of the critical data 215. Network 203 thus represents a "fog" of devices comprising laptops/desktops, edge devices, and so on, where each device contains a portion of the index required to restore the data. Each device can forward the heartbeat signal to other connected and registered devices.

In an embodiment, the data protection system 212 sends a canary signal 219 back to the devices 203. The canary signal is generally a message that is automatically sent along with the messages normally exchanged during a backup, to indicate that an attack has occurred. By sending the signal in this manner, an attacker monitoring the network would not see a separate message burst or an explicit acknowledgment that their attack has been detected.

In system 200, if the heartbeat 213 is lost or a canary signal 219 is detected, the devices 203 enter a lockdown mode to prevent exfiltration/expiration of data.

In general, component 212 is not required to restore the data, as it could itself become unavailable or compromised. It can, however, be made highly available using standard techniques like active-passive deployments, and so on.

For the embodiment of system 200, the primary backup software 212 and storage 218, as well as the cyber vault environment 220 are implemented as normal. There is generally no change to vault air gap 221 or direction of data flowing into the vault storage 228.

In an embodiment, each device within devices 203 may include a running client agent that communicates with the data protection system 212, such as through an extension of the backup agent that is already communicating with the backup system, or as a separate backup agent. Such an agent controls how the signals (e.g., 213, 219) and data (e.g., 215, 217) flow back and forth within system 200

With respect to allocating memory on each device, the agent can be configured to report on a device's free space during registration and periodically afterwards (e.g., hourly or daily). The DDPS 212 has a configurable amount of storage per device to use for the distributed backup data, specified as either a percentage or a fixed amount (e.g., 1 GB). The DDPS manages the distribution of chunks accordingly so as not to exceed the limit on any given device. It would also provide administrators with data on used, available, and total capacity. If running out of space, administrators can either reconfigure the storage to be used per device, add more devices, or adjust their policies to move less data into the distributed data storage, similarly to how space is managed in the backup storage 218 or cyber vault storage 228.

Figure 3:
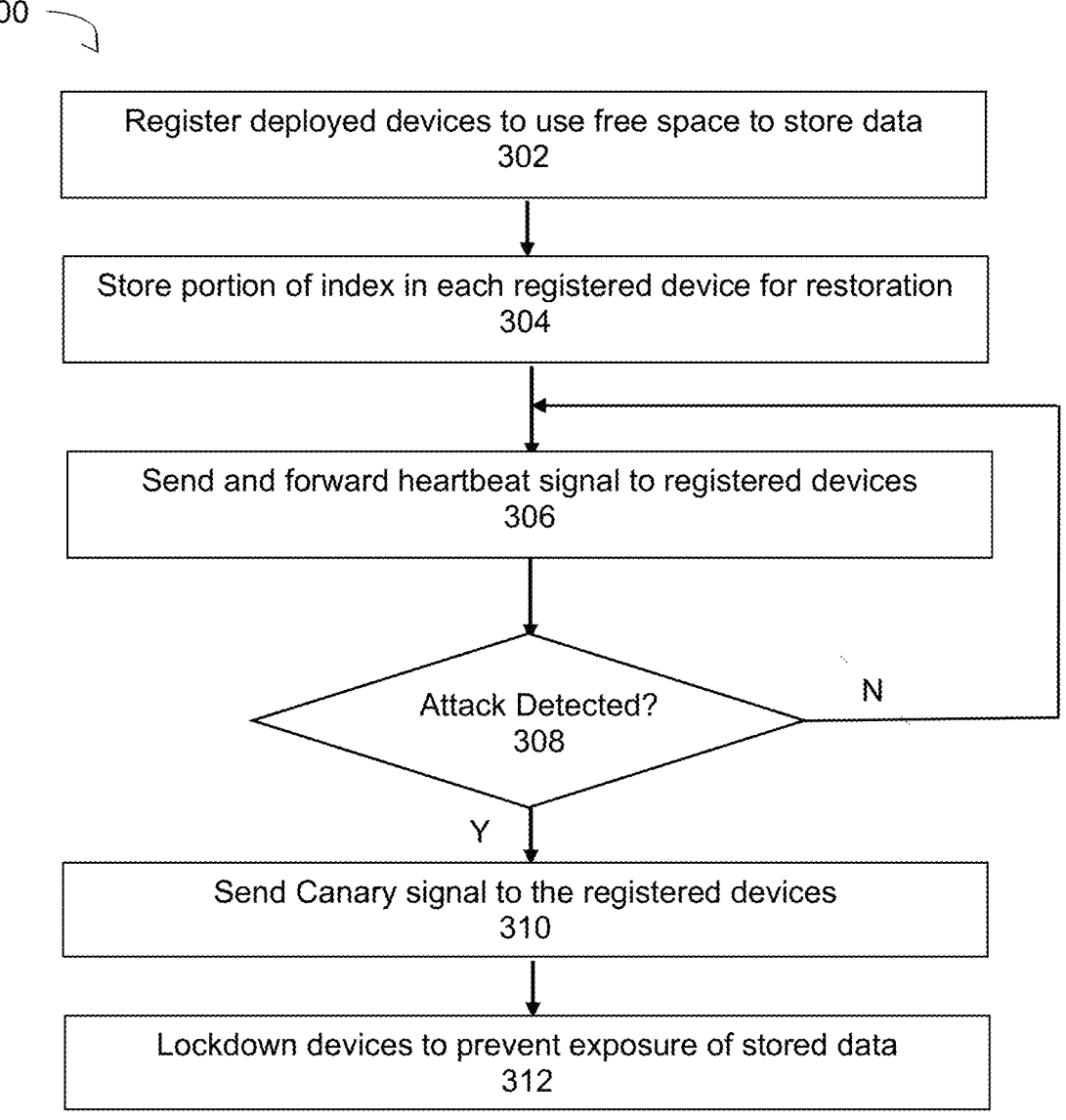
FIG. 3 is a flowchart that illustrates an overall process of providing data security using distributed devices, under some embodiments.

FIG. 3 is a flowchart that illustrates an overall process of providing data security through DDPS component 214, under some embodiments. For process 300, a large number of deployed devices within the production environment are registered to use their free space to store the critical backup data, 302. A portion of the index required to restore the data is stored in each registered device, 304. The index is generally a table containing information about each chunk stored on the device, along with the chunk's hash and the source device, file path, and offset into the file. The index file is updated as each chunk is added to the device.

If an attack is detected, 308, the system suspends the heartbeat signal and sends a canary signal from the DP system 212 to the devices 203, step 310. The devices then enter lockdown to prevent exposure of the data, 312. The system continues to send a heartbeat signal to the devices until an attack is detected in step 308.

Figure 4:
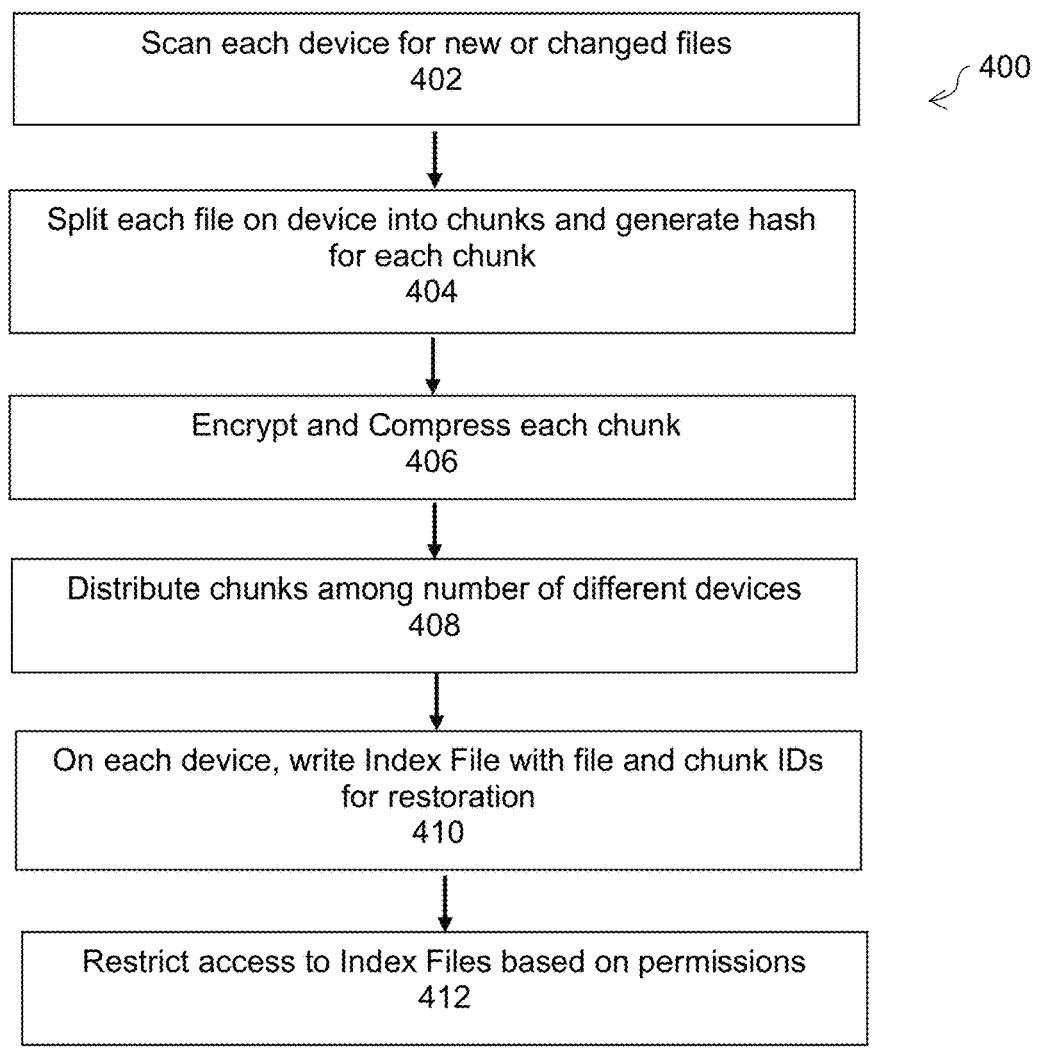
FIG. 4 is a flowchart that illustrates a process of backing up data among devices in a distributed data protection system, under some embodiments.

In an embodiment, files for the data 215 to be stored among the distributed devices 203 are split up into chunks for storage on individual devices. FIG. 4 is a flowchart that illustrates a process of backing up data among devices in a distributed data protection system, under some embodiments. In process 400, each device in network 203 is scanned for new or changed files since a last backup, 402. Any such file comprises a file marked for backup. For each file (F(1)) on a device ((D(1)) marked for backup, the system splits the file F(1) into a number N of chunks (Cn), 404. The chunks may be fixed or variable size, depending on implementation and configuration. Content hashes (H(1) to H(C)) are then generated for all chunks using SHA-256 or similar techniques.

The system next encrypts and compresses all chunks, 406. Any appropriate key-based encryption mechanism can be used, and the Encryption keys may be managed and secured via a user's Key Management Server, or other appropriate system.

The chunks C(1)-C(N) are then distributed evenly (one-to-one) across the number of devices D(2)-D(N) with some FTT=M. Here, M is the number of devices that can become inaccessible while still being able to recover all chunks 1–N. The failure to tolerate (FTT) measure generally defines the number of host and device failures that a VM object can tolerate.

In an embodiment, the distribution of chunks among devices can be performed using any appropriate method, such as double/triple-mirroring, parity chunks, other erasure coding, and so on. For example, if FTT=2, a triple-mirroring scheme can be used, and a copy of each chunk is stored across three separate devices, such that if two devices become inaccessible, the chunk is still available on one device.

Figure 5:
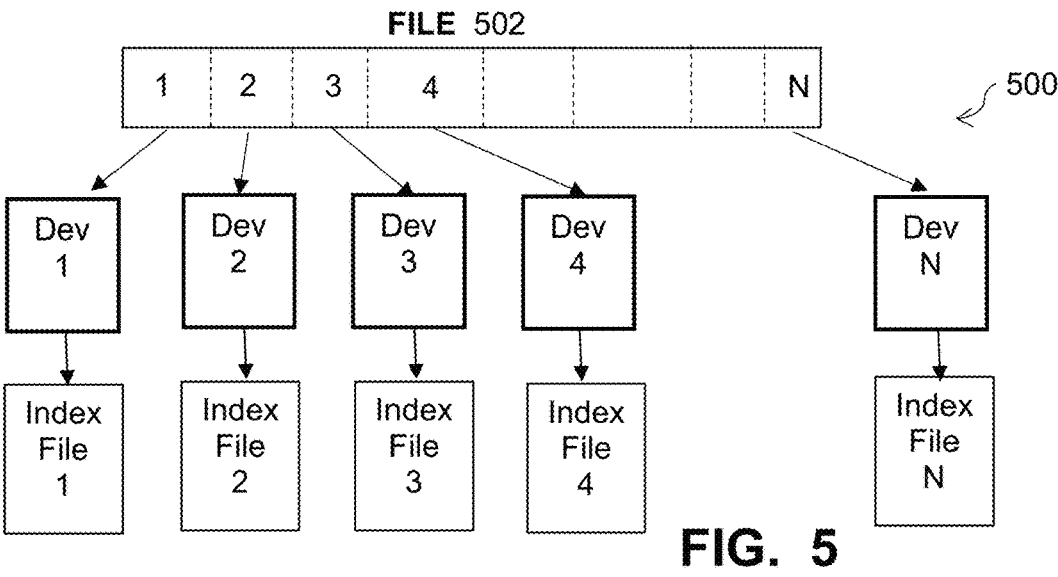
FIG. 5 illustrates the distribution of file chunks among devices in a distributed data protection system, under some embodiments.

FIG. 5 illustrates the distribution of file chunks among devices in a distributed data protection system, under some embodiments. As shown in diagram 500 of FIG. 5, a file 502 is divided into a number of identical or variable-size chunks, numbered 1 to N. The number N corresponds to the number of devices selected and configured to store the distributed data. Thus, each chunk is stored in a corresponding device, Dev 1 to Dev N, as shown.

On each device that stores data chunks from the backed up device, the system writes to a corresponding Index File I(N), as shown for step 410 of FIG. 4 and in FIG. 5. Each Index File contains entries with: {File ID, Chunk ID, Hash of Chunk}. This information is used to help reconstruct the file for data restores. Instead of individual Index Files for each device, the file/chunk ID and hashes for each device may be stored in a single file or database indexed by device number.

The Index File access permissions are restricted to administration and/or security officer roles based on any appropriate RBAC, credential, or other access controls, 412.

After the data is backed up to the distributed devices 203, it is now distributed among any number of devices, depending on how the files are chunked. Any appropriate file granularity may be used, depending on system configuration and requirements. Systems such as Data Domain typically have methods for fixed or variable-size chunking, and any appropriate method can be used for a given device being backed up. The distributed data can then be retrieved these disparate devices and reconstructed in the event of a cyber-attack.

FIG. 6 is a flowchart that illustrates a process of restoring data backed up among devices in a distributed data protection system, under some embodiments. The process 600 begins when the device D(1)-D(N) are notified of an attack, step 602. This can be through one of several mechanisms including failure of the heartbeat signal or receipt of a canary signal. For example, if the heartbeat 213 from DDPS 214 has not been received for a certain time (e.g., 10 minutes), and attack notification can be triggered. Similarly, while performing a backup or restore, a canary signal 219 may be received from the backup software/storage system indicating an attack.

When a device receives indication of an attack, it enters a lockdown mode, 602. Such a mode typically comprises a default secure state defined for a device, such as by shutting down its external interfaces and preventing read/write (R/W) operations to its memory.

After the attack condition is resolved, the data can then be restored from the distributed devices. In an embodiment, the data restore requires a manual process or administrator initiated restoration, 606. For example, the administrator or security officer logs in to any device D(x) and requests one or more files stored for the backed up device D. The request may be for all files or a specific file, e.g., F(1). The device D(x) looks for Index File I(1) corresponding to the backed up device D. If present, any chunks related to the requested files are sent back to D(x), step 608. This process is repeated across all devices until all chunks corresponding to all requested files have been received. Only a subset of the total devices need to be present and return chunks depending on the chunk distribution method used during the backup for device D.

For each file, the chunks are decrypted, uncompressed, and appended together in sequence until the file is reconstructed, step 610. This process is repeated for each device to be restored.

The distributed data protection system 200 thus provides a way to distribute and reconstruct backup data for a device among a large number of other devices within the network to eliminate single points of vulnerability and increase the chance of data restoration after a cyber-attack. Unlike present systems that provide a soft-air-gapped vault to separate production backups from a cyber-protected copy, but that also consolidate critical data into one physical location, embodiments of the distributed data protection system support storing the data from one asset or device into other devices.

As described above, in an embodiment, system 100 include certain processes that may be implemented as a computer implemented software process, or as a hardware component, or both. As such, it may be an executable module executed by the one or more computers in the network, or it may be embodied as a hardware component or circuit provided in the system. The network environment of FIG. 1 may comprise any number of individual client-server networks coupled over the Internet or similar large-scale network or portion thereof. Each node in the network(s) comprises a computing device capable of executing software code to perform the processing steps described herein.

FIG. 7 is a block diagram of a computer system used to execute one or more software components of a system implementing distributed data protection, under some embodiments. The computer system 1000 includes a monitor 1011, keyboard 1016, and mass storage devices 1020. Computer system 1000 further includes subsystems such as central processor 1010, system memory 1015, input/output (I/O) controller 1021, display adapter 1025, serial or universal serial bus (USB) port 1030, network interface 1035, and speaker 1040. The system may also be used with computer systems with additional or fewer subsystems. For example, a computer system could include more than one processor 1010 (i.e., a multiprocessor system) or a system may include a cache memory.

Arrows such as 1045 represent the system bus architecture of computer system 1000. However, these arrows are illustrative of any interconnection scheme serving to link the subsystems. For example, speaker 1040 could be connected to the other subsystems through a port or have an internal direct connection to central processor 1010. The processor may include multiple processors or a multicore processor, which may permit parallel processing of information. Computer system 1000 shown in FIG. 4 is an example of a computer system suitable for use with the present system. Other configurations of subsystems suitable for use with the present invention will be readily apparent to one of ordinary skill in the art.

Computer software products may be written in any of various suitable programming languages. The computer software product may be an independent application with data input and data display modules. Alternatively, the computer software products may be classes that may be instantiated as distributed objects. The computer software products may also be component software. An operating system for the system may be one of the Microsoft Windows®. family of systems (e.g., Windows Server), Linux, Mac OS X, IRIX32, or IRIX64. Other operating systems may be used. Microsoft Windows is a trademark of Microsoft Corporation.

Although certain embodiments have been described and illustrated with respect to certain example network topographies and node names and configurations, it should be understood that embodiments are not so limited, and any practical network topography is possible, and node names and configurations may be used. Likewise, certain specific programming syntax and data structures are provided herein. Such examples are intended to be for illustration only, and embodiments are not so limited. Any appropriate alternative language or programming convention may be used by those of ordinary skill in the art to achieve the functionality described.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device.

Unless the context clearly requires otherwise, throughout the description and the claims, the words "comprise," "comprising," and the like are to be construed in an inclusive sense as opposed to an exclusive or exhaustive sense; that is to say, in a sense of "including, but not limited to." Words using the singular or plural number also include the plural or singular number respectively. Additionally, the words "herein," "hereunder," "above," "below," and words of similar import refer to this application as a whole and not to any particular portions of this application. When the word "or" is used in reference to a list of two or more items, that word covers all of the following interpretations of the word: any of the items in the list, all of the items in the list and any combination of the items in the list.

All references cited herein are intended to be incorporated by reference. While one or more implementations have been described by way of example and in terms of the specific embodiments, it is to be understood that one or more implementations are not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer-implemented method of backing up data in a distributed network, comprising:

deploying a plurality of networked portable devices, on the order of multiple hundreds of devices each operated by different users and implementing different technologies to present disparate attack vulnerabilities, to protect data of a target device in the network, wherein each device of the plurality of devices contains memory sufficient to store at least a portion of backed up data from the target device;

registering each device of the plurality of networked devices to indicate configuration as a storage device within a mass group of similarly configured devices;

reporting, from the each device, an amount of free space as part of the registering;

periodically forwarding a heartbeat signal through each device of the mass group;

storing index information for backup data of the target device stored in each device of the plurality of devices, wherein each device contains a portion of an index required to restore the backup data;

initiating, upon detection of a cyber-attack on the network, a lockdown operation on each device of the plurality of devices;

transmitting a canary signal indicating the detection along with normal backup messages to each of the plurality of networked devices to eliminate a need to send detectable burst or acknowledgment signals regarding the cyber-attack;

initiating a lockdown of the plurality of networked devices if at least one of the heartbeat signal lost or the canary signal is detected;

using the index information to reconstruct the backed up data from the portion of the index stored on each respective device of the plurality of devices; and storing the backed up data in a data protection system (DPS) comprising a cyber vault physically isolated by an automated operational air gap within a protected part of the distributed network.

2. The method of claim 1 wherein the backup data of the target device comprises files that are new or changed from a prior backup of the target device, and further wherein the plurality of devices comprises an amorphous body of portable communication devices not having a common vulnerability that can be feasibly exploited by the cyber-attack.

3. The method of claim 2 further comprising splitting a file of the backup data into a plurality of chunks corresponding to a number of devices selected to store the backup data.

4. The method of claim 3 further comprising:

generating a hash of each chunk of the plurality of chunks;

encrypting each chunk; and compressing each chunk.

5. The method of claim 4 further comprising writing a file ID, chunk ID, and hash value for each chunk to an index file for each device of the number of devices selected to store the backup data.

6. The method of claim 5 wherein the index file comprises one of: an individual file maintained within each device of the number of devices, or an indexed entry to a database storing index files for all devices of the number of devices.

7. The method of claim 3 wherein the number of devices selected to store the backup data are selected based upon a failure to tolerate (FTT) metric defining a minimum number failures that the target device can tolerate for the backed up data.

8. The method of claim 7 wherein the chunks are distributed among the number of devices using a distribution scheme selected from one of: double mirroring, triple mirroring, parity, or erasure coding.

9. The method of claim 1 wherein the heartbeat signal is considered lost if not received after a defined amount of time.

10. The method of claim 1 further comprising restricting access to the index file to authorized users only based on one or more access control procedures.

11. The method of claim 1 wherein the portable devices comprise personal computer devices, communication devices, and network edge devices.

12. The method of claim 1 wherein the data protection system (DPS) implements a deduplication backup process to store data from the target device to the cyber vault.

13. A computer-implemented method of providing distributed protection of data, comprising:

deploying a plurality of networked portable devices, on the order of multiple hundreds of devices each operated by different users and implementing different technologies to present disparate vulnerabilities to a cyber-attack, dividing a file to be backed up from a target device into a plurality of chunks;

storing each chunk in a different respective device of the plurality of devices coupled to the target device over a network;

registering each device of the plurality of networked devices to indicate configuration as a storage device within a mass group of similarly configured devices;

reporting, from the each device, an amount of free space as part of the registering;

storing the backed up data in a data protection system (DPS) comprising a cyber vault physically isolated by an automated operational air gap within a protected part of the distributed network;

periodically forwarding a heartbeat signal through each device of the mass group;

storing index information for each chunk in each device of the plurality of devices, wherein each device contains a portion of an index required to restore the backup data;

transmitting, in the event of the cyber-attack, a canary signal along with normal backup messages to each of the plurality of networked devices to eliminate a need to send detectable burst or acknowledgment signals regarding any data attack;

detecting the cyber-attack on the network by detection of at least one of a lost heartbeat signal or the transmission of the canary signal;

locking down each device upon detection of the cyber-attack; and restoring, after cessation of the cyber-attack, the backup data to the target device using the index information.

14. The method of claim 13 further comprising scanning the plurality of devices for files added or changed since a last backup to identify the target device, and further wherein the plurality of devices comprises an amorphous body of portable communication devices not having a common vulnerability that can be feasibly exploited by the cyber-attack.

15. The method of claim 13 wherein failure of the heartbeat signal is indicated after a defined amount of time.

16. The method of claim 13 further comprising:

generating a hash of each chunk of the plurality of chunks;

encrypting each chunk; and compressing each chunk, and wherein the index information comprises a file ID, chunk ID, and hash value for each device of the plurality of devices.

17. The method of claim 13 wherein the plurality of devices are selected among all devices of the network to store the backup data are selected based upon a failure to tolerate (FTT) metric defining a minimum number failures that the target device can tolerate for the backed up data, and further wherein the chunks are distributed among the number of devices using a distribution scheme selected from one of: double mirroring, triple mirroring, parity, or erasure coding.

18. The method of claim 13 wherein the plurality of devices comprises personal computer devices, communication devices, and network edge devices, and further wherein the backed up data is stored by a deduplication backup process.

19. The method of claim 13 further comprising storing the index information in a respective index file or database entry associated with each device, and restricting access to the index information to authorized users only based on one or more access control procedures.

20. A system for backing up data in a distributed network, comprising:

a target device sourcing data to be backed up as backup data;

a plurality of networked portable devices, on the order of multiple hundreds of devices each operated by different users and implementing different technologies to present disparate attack vulnerabilities, deployed in the network to protect the backup data, wherein each device of the plurality of devices contains memory sufficient to store at least a portion of backed up data from the target device;

a database storing index information for backup data of the target device stored in each device of the plurality of devices, and registration information for the each device indicating respective configuration as storage devices within a mass group of similarly configured devices, and further storing an amount of free space reported from the each device as part of the registration information, and further wherein each device contains a portion of an index required to restore the backup data;

a signal generator periodically forwarding a heartbeat signal through each device of the mass group and transmitting a canary signal along with normal backup messages to each of the plurality of networked devices to eliminate a need to send detectable burst or acknowledgment signals regarding the cyber-attack;

a detector detecting a cyber-attack on the network in order to initiate a lockdown operation on each device of the plurality of devices if at least one of the heartbeat signal lost or the canary signal is detected;

a data protection component using the index information to reconstruct the backed up data from the portion of the index stored on each respective device of the plurality of devices; and a cyber vault physically isolated by an automated operational air gap within a protected part of the distributed network and configured to store the backed up data.

* * * * *